(12) United States Patent
Uppal

(10) Patent No.: US 10,017,121 B2
(45) Date of Patent: Jul. 10, 2018

(54) METHOD FOR ADJUSTING A POSITION OF A VEHICLE MIRROR

(71) Applicant: FORD GLOBAL TECHNOLOGIES, LLC, Dearborn, MI (US)

(72) Inventor: Vaibhav Uppal, Basildon (GB)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/182,996

(22) Filed: Jun. 15, 2016

(65) Prior Publication Data

US 2016/0368422 A1 Dec. 22, 2016

(30) Foreign Application Priority Data

Jun. 17, 2015 (GB) .................................. 1510656.0

(51) Int. Cl.
  *B60R 1/12* (2006.01)
  *B60R 1/00* (2006.01)
  (Continued)

(52) U.S. Cl.
  CPC .................. *B60R 1/12* (2013.01); *B60R 1/00* (2013.01); *B60R 1/02* (2013.01); *B60R 1/072* (2013.01);
  (Continued)

(58) Field of Classification Search
  CPC .... B60R 1/12; B60R 1/00; B60R 1/02; B60R 1/072; B60R 1/08; B60R 2001/1253; G02B 27/0093; G06F 3/013; G06K 9/00597
  (Continued)

(56) References Cited

U.S. PATENT DOCUMENTS

| 4,625,329 A | 11/1986 | Ishikawa et al. |
| 5,748,473 A | 5/1998 | Breed et al. |

(Continued)

FOREIGN PATENT DOCUMENTS

| CN | 2030063816 U | 7/2013 |
| EP | 0 030 925 A1 | 6/1981 |

(Continued)

OTHER PUBLICATIONS

Intellectual Property Office, Combined Search and Examination Report for corresponding Great Britain Patent Application No. GB1510656.0 dated Nov. 27, 2015.

(Continued)

*Primary Examiner* — Krishnan Ramesh
(74) *Attorney, Agent, or Firm* — Brooks Kushman P.C.

(57) ABSTRACT

A method for adjusting an angular position of a vehicle based on the position and gaze direction of the eye (or eyes) of a driver of the vehicle, and where the driver's line-of-sight intersects the mirror. A camera images the driver's eyes and determines and tracks the position, gaze direction, and any changes therein. An electronic controller determines the driver's line-of-sight and adjusting an orientation of the mirror of the vehicle in response to the movement of the driver's eye, to adjust the driver's field-of-view through the mirror. A point of intersection between the line-of-sight and a reference position on the mirror is determined, and an offset direction and/or distance between a datum location on the mirror and the point of intersection may be used to determine the mirror adjustments.

6 Claims, 5 Drawing Sheets

(51) Int. Cl.
  *B60R 1/02* (2006.01)
  *B60R 1/072* (2006.01)
  *B60R 1/08* (2006.01)
  *G02B 27/09* (2006.01)
  *G02B 27/00* (2006.01)
(52) U.S. Cl.
  CPC ............ *B60R 1/08* (2013.01); *G02B 27/0093* (2013.01); *B60R 2001/1253* (2013.01)
(58) Field of Classification Search
  USPC .......................................................... 701/49
  See application file for complete search history.

(56) References Cited

U.S. PATENT DOCUMENTS

| | | | |
|---|---|---|---|
| 5,822,707 A | 10/1998 | Breed et al. | |
| 5,983,147 A | 11/1999 | Krumm | |
| 6,078,854 A | 6/2000 | Breed et al. | |
| 6,253,134 B1 | 6/2001 | Breed et al. | |
| 6,330,501 B1 | 12/2001 | Breed et al. | |
| 9,446,716 B2 * | 9/2016 | Bouaziz | B60R 1/02 |
| 9,815,409 B2 * | 11/2017 | Baur | B60R 1/00 |
| 2001/0003168 A1 | 6/2001 | Breed et al. | |
| 2001/0038698 A1 | 11/2001 | Breed et al. | |
| 2002/0125050 A1 | 9/2002 | Breed et al. | |
| 2003/0116362 A1 | 6/2003 | Breed et al. | |
| 2003/0151563 A1 | 8/2003 | Kulas | |
| 2006/0176165 A1 * | 8/2006 | Deline | B60K 35/00 340/461 |
| 2006/0282204 A1 | 12/2006 | Breed | |
| 2007/0096445 A1 | 5/2007 | Breed | |
| 2007/0135982 A1 | 6/2007 | Breed et al. | |
| 2010/0265600 A1 | 10/2010 | Okuda et al. | |
| 2011/0102923 A1 * | 5/2011 | Lang | B60R 1/081 359/865 |
| 2011/0122520 A1 | 5/2011 | Verheyden | |
| 2014/0354798 A1 | 12/2014 | Galarraga | |
| 2015/0232033 A1 * | 8/2015 | Bouaziz | B60R 1/07 701/49 |
| 2016/0137132 A1 * | 5/2016 | Sobecki | B60R 1/072 296/1.11 |
| 2016/0243988 A1 * | 8/2016 | Peterson | B60R 1/072 |
| 2017/0305352 A1 * | 10/2017 | Bouaziz | B60R 1/078 |

FOREIGN PATENT DOCUMENTS

| | | |
|---|---|---|
| GB | 2315136 A | 1/1998 |
| GB | 2508860 A | 6/2014 |
| WO | 96/16838 A1 | 6/1996 |
| WO | 2012172492 A1 | 12/2012 |
| WO | 2014044341 A1 | 3/2014 |

OTHER PUBLICATIONS

Intellectual Property Office, Examination Report for corresponding Great Britain Patent Application No. GB1510656.0 dated Apr. 15, 2016.

* cited by examiner

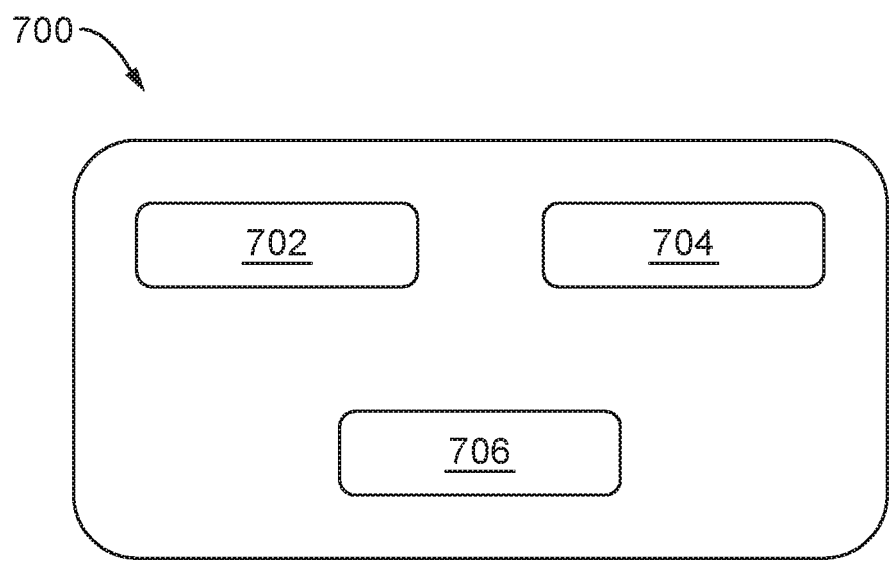

METHOD FOR ADJUSTING A POSITION OF A VEHICLE MIRROR

CROSS-REFERENCE TO RELATED APPLICATIONS

This application claims foreign priority benefits under 35 U.S.C. § 119(a)-(d) to GB 1510656.0 filed Jun. 17, 2016, which is hereby incorporated by reference in its entirety.

TECHNICAL FIELD

The present disclosure relates to a method for adjusting a mirror of a vehicle and is particularly, although not exclusively, concerned with a method for adjusting a mirror to provide improved visibility for a driver of the vehicle.

BACKGROUND

Rear view mirrors and wing mirrors provide a driver of a vehicle with a reflected view to the rear of the vehicle. Considering the rear view may be important before and during many maneuvers, including turning, reversing and merging into traffic. The ideal view for each maneuver may be different and the driver may be inclined to adjust the mirror or move the position of his or her head to gain the ideal view. In some cases the driver may need to look behind them directly to gain a particular view which is in a "blind spot" of the mirror.

The need for the driver to adjust the mirror or move his or her head into a comfortable position to gain a desired view may be an annoyance. In addition, if the driver needs to look behind them to check the blind spot the time the driver spends looking at the road ahead may be reduced.

Some mirrors may include mirrored surfaces that are curved. The mirrored surface may provide different levels of magnification of the reflected image in different portions of the mirror. This may allow the mirror to extend the field-of-view provided at certain angles, for example to reduce the size of the blind spot. Such mirrors may however impair the driver's ability to judge distances and speeds of any obstacles or other vehicles seen in the mirror.

With reference to FIG. 1, a vehicle, such as a motor vehicle 2 may comprise a plurality of mirrors as are known in the prior art, such as a rear view mirror 4 and wing mirrors 6.

The rear-view mirror 4 may be provided substantially centrally within the vehicle and may be configured to provide the driver with a view in a substantially central area behind the driver. The wing mirrors 6 may be provided on the left and right sides of the vehicle and may be configured to provide the driver with a view behind and to the left and right sides of the vehicle respectively. The position and/or angular orientation of the mirrors 4, 6 may be adjusted by the driver to provide the desired visibility during driving.

With reference to FIG. 2, a prior art mirror, such as the wing mirror 6, may comprise a housing 8 and a mirror surface 10. The mirrored surface 10 may be supported by a connecting rod 14 coupled to an adjustor 12. The adjustor 12 may be coupled to the housing 8. The adjustor 12 may be an electrically powered adjustor capable of adjusting the angular orientation of the mirrored surface 10 by controlling the orientation of the connecting rod 14. In particular, the angular orientation of the mirrored surface may be controlled to tilt the mirrored surface upwards or downwards and towards or away from the vehicle (e.g. left or right). The adjustor 12 may receive a control signal from a control system (not shown) via a control cable 16. The control system may comprise one or more buttons or switches and/or may comprise a multi-directional control lever. The driver may use the control system to adjust the field-of-view provided by the mirror.

In particular, the mirrors 4, 6 may be adjusted such that vehicles in proximity to the vehicle, either travelling directly behind the vehicle or in an adjacent lane of traffic, can be seen by the driver. Vision of other vehicles may be important when performing certain maneuvers, such as reversing, turning, merging or changing lanes. The driver may adjust the rear view mirror such that driver's view in the rear view mirror is not obscured by any portion of the vehicle behind the driver, e.g. head rests or rear seats of the vehicle. The driver may adjust the wing mirrors such that a rear portion of the vehicle is visible in the mirror, in order that the driver may judge the relative position of other vehicles visible in the mirror.

The mirrors 4, 6 may also be adjusted by the driver when performing certain maneuvers to provide a particular field-of-view desired for the specific maneuver. For example, the driver may adjust the mirror when reversing to provide a better view of an obstacle, such as a bollard, which the driver wants to avoid, or a better view of a road marking which the driver wants to position the vehicle relative to.

Even when the mirrors 4, 6 have been adjusted to provide the best possible view for the driver, certain areas around the vehicle, known as blind spots, may not be visible in the mirrors. In order to check whether another vehicle or an obstacle is present in the blind spot, the driver may be required to turn around to directly look at the blind spot area. Checking the blind spot in this way may reduce the time that the driver is able to look ahead of the vehicle.

In order to reduce the size of the blind spot and limit the need for the driver to turn around, the mirrored surface 10 may be non-planar, for example the mirrored surface may be concave or convex over certain areas of the mirror. The mirror may comprise a combination of concave and convex portions. The non-planar nature of the mirrors may alter the magnification of the reflected image in certain areas, which may provide a wider field-of-view for the driver and may reduce the size of the blind spot. Additionally or alternatively, a portion of the mirror may be angled with respect to another portion of the mirror. This may provide the driver with a broader field-of-view, which may minimize blind spots. For example, with reference to FIG. 1, in order to increase the field-of-view of the driver, an additional mirror, such as a blind spot mirror 18 may be provided. The blind spot mirror 18 may be coupled to the housing 8 of the wing mirror 6. The blind spot mirror may be configured to provide the driver with a view of the blind spot of the wing mirror 6.

Providing a non-planar, or partially angled mirror, as described above, may increase the field-of-view of the driver and/or reduce the size of the blind spot. However, the reflected image provided to the driver may be distorted and the ability of the driver to judge relative positions and speeds of other vehicles or obstacles, visible in the mirror, may be reduced.

SUMMARY

According to an aspect of the present disclosure, there is provided a method for adjusting a mirror of a vehicle, the method comprising: operating a camera configured to track the movement of an eye of a driver of the vehicle; tracking movement of the driver's eye; determining the driver's line-of-sight; and adjusting an orientation of the mirror of the vehicle in response to the movement of the driver's eye, to adjust the driver's field-of-view through the mirror.

The camera may be a 3D camera. The camera may be configured to determine a 3D position of the eye of the driver. The orientation of the mirror of the vehicle may be adjusted according to the 3D position of the driver's eye. The mirror may be adjusted such that a field-of-view provided to the driver by the mirror may be substantially unaffected by a change in the 3D position of the driver's eye.

The method may further comprise determining a desired reflected line-of-sight and/or field-of-view of the driver. The method may comprise adjusting the orientation of the mirror to move towards the desired field-of-view of the driver.

Tracking movement of the driver's eye may comprise determining a point or position on the mirror at which the driver may be looking relative to the center of the mirror. Looking at a position away from the center of the mirror may cause the angular orientation of the mirror to be adjusted to move the field-of-view. Looking at a position towards the center of the mirror may cause the angular orientation of the mirror to return to the position prior to adjustment.

The orientation of the mirror may be adjusted such that an object seen by the driver at a position away from the center of the mirror may be seen at a position closer to the center of the mirror following adjustment.

The method may further comprise detecting a driving mode of the vehicle, such as parked or cruise, or a maneuver such as reversing, merging, turning etc. The range of possible adjustments to the position and/or orientation of the mirror may be determined according to the detected driving mode, e.g. the type of maneuver.

The method may further comprise adjusting the position and/or orientation of the mirror to adjust the field-of-view provided to the driver by the mirror according to the detected driving mode. For example, the field-of-view provided by a wing mirror may be directed downwards when a reverse maneuver is detected.

Adjusting the angular orientation of the mirror of the vehicle in response to the movement of the driver's eye may be performed when one or more predetermined driving modes are detected. Adjusting the orientation of the mirror of the vehicle in response to the movement of the driver's eye may not be performed when one or more predetermined further driving modes are detected.

The mirror may comprise a flat planar mirrored surface. The mirror may provide substantially constant magnification of the reflected image over the mirrored surface.

The position and/or orientation of the mirror may be adjusted dynamically.

The mirror may be a rear view mirror. Additionally or alternatively, the mirror may be a wing mirror.

The mirror may be adjustable in response to a signal from a controller.

The method may further comprise detecting an object of interest to the driver; and adjusting the field-of-view such that the object is visible to the driver. The object of interest may be outside the field-of-view of the driver prior to the adjustment.

A controller may be configured to perform any of the above-mentioned methods.

Software, which when executed by a computing device, may be provided which causes the computing device to perform the method previously mentioned aspects of the disclosure.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For a better understanding of the present invention, and to show more clearly how it may be carried into effect, reference will now be made, by way of example, to the accompanying drawings, in which:

BRIEF DESCRIPTION OF THE DRAWINGS

FIG. 7 is a schematic view of a controller configured to adjust a mirror of a vehicle according to an arrangement of the present disclosure.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 3:
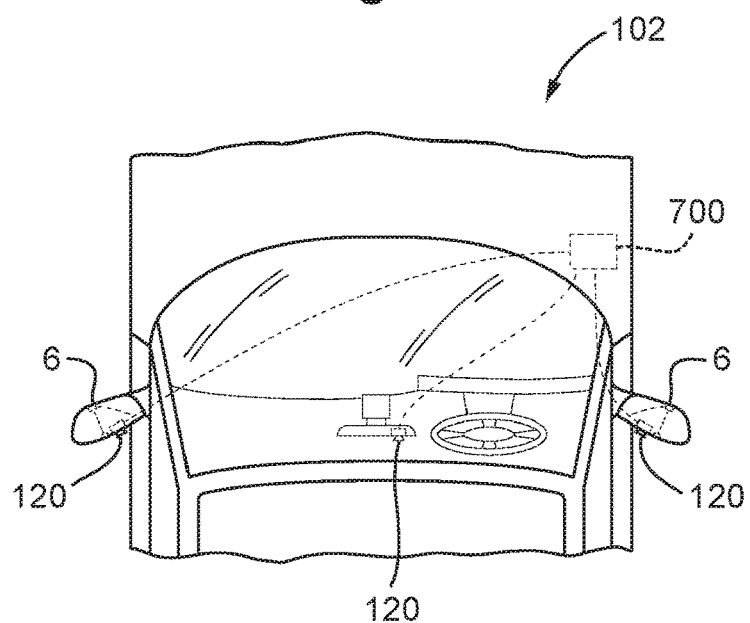
FIG. 3 is a top view of a motor vehicle according to an arrangement of the present disclosure.

With reference to FIG. 3, a vehicle 102, according to an arrangement of the present disclosure, may comprise the mirrors 4, 6, one or more cameras, such as a 3D camera 120, and a controller 700. The 3D camera 120 may be provided within or on the vehicle 102 and may be configured to capture a 3D image of the driver, of the vehicle.

The 3D camera 120 may be provided substantially centrally within the vehicle. For example, the 3D camera 120 may be provided adjacent to, or as part of the rear view mirror 4. Additionally or alternatively, the 3D camera 120 may be provided to one side of the vehicle, for example in front of the driver. Again, additionally or alternatively, the 3D camera may be provided on or as part of the wing mirror 6.

The 3D camera 120 may comprise two or more cameras, such as digital cameras, which may be arranged in offset positions relative to one another. In other words, the cameras may be spaced apart from one another. The cameras may have an overlapping field-of-view. Using data from the two cameras, 3D information can be extracted by combining the relative positions of objects or parts of objects in the two images. Alternatively, one of the cameras may comprise a depth sensor, e.g. an infrared laser projector and sensor. As is well known in the art of vision-based driving assistance systems, the 3D camera may further comprise or provide images to a controller configured to convert images captured by the cameras into the 3D image. Alternatively, the 3D camera may comprise any other system capable of producing a 3D image. The 3D image may comprise information relating to a distance from an object captured in the image to the 3D camera. The 3D image may allow a 3D position of the object, relative to the camera, to be determined and/or a 3D representation of the object to be generated.

The 3D camera 120 may be configured to determine a 3D position of an eye or eyes of the driver. The 3D camera 120 may also be configured to track the movement of the eye or eyes of the driver of the vehicle. The terms "track" or "tracking" as used herein are understood to mean measuring or detecting the tracked quantity or characteristic continuously as the vehicle operated so as to detect changes in the tracked quantity or characteristic. The 3D camera 120 and the controller 700 may be configured to determine the direction in which the eye of the driver is looking, referred to herein as a gaze direction, (e.g. by determining the position of the pupil and/or iris relative to the rest of the face) and may be configured to track the direction in which the driver's eye is looking, e.g. track what the driver is looking at and/or where the driver is looking relative to the 3D Camera 120 and/or the mirrors 4,6. The controller 700 may be configured to adjust the angular orientation of the mirrors 4, 6 in response to the movement of the driver's eye and/or a change in the direction in which the driver's eye is looking.

Figure 4:
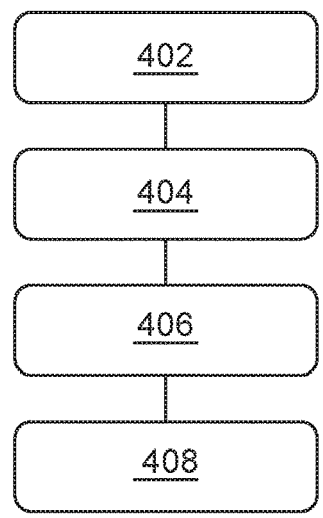
FIG. 4 shows a method of adjusting a mirror of a vehicle, according to an arrangement of the present disclosure.

With reference to FIG. 4, a method 400 for adjusting a mirror of a vehicle, according to an example of the present disclosure, may comprise a first step 402, in which movement of one or both of the driver's eyes is tracked. Using the location of the driver's eye(s), and the direction it is looking in, the driver's line-of-sight is determined in a second step 404. As described further below, the angular orientation of the mirror of the vehicle is then adjusted in response to the movement of the driver's eye, to adjust the field-of-view through the mirror.

In the first step 402, the 3D camera 120 may calculate the 3D position of the driver's eye using the 3D image. The 3D camera 120 may also determine the gaze direction (the direction in which the eye is looking) and may track changes the position and/or the gaze direction.

The mirrors 4, 6 may be provided in a known location on the vehicle 102 relative to the 3D camera 120, and hence in the second step 404 the driver's line-of-sight may be determined and may be used to determine whether the driver is looking at the mirror. Additionally, determining the driver's line-of-sight may allow the position at which the driver is looking relative to the mirrors 4, 6 to be determined. The orientation of the mirrors may be known, and hence a reflected line-of-sight of the driver may be determined (step 406).

Figure 1:
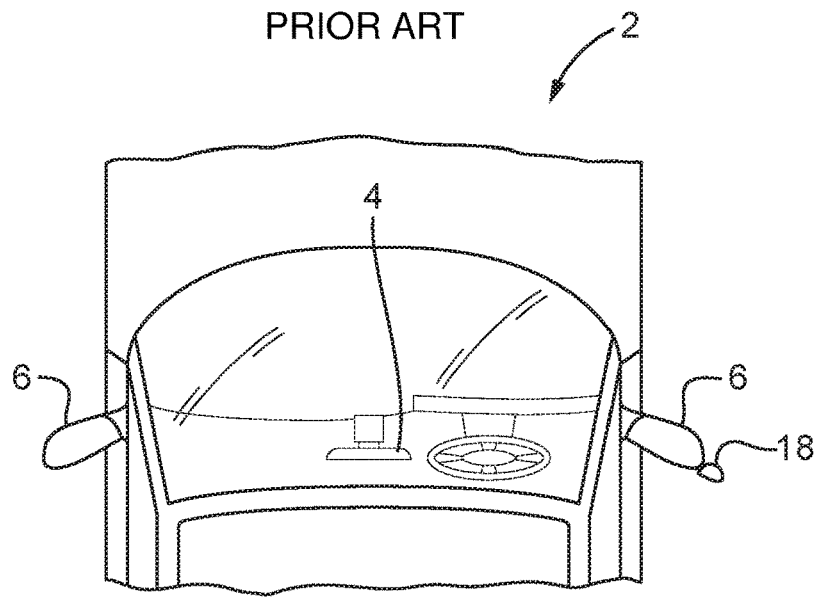
FIG. 1 is a top view of a motor vehicle according to known prior art.
Figure 2:
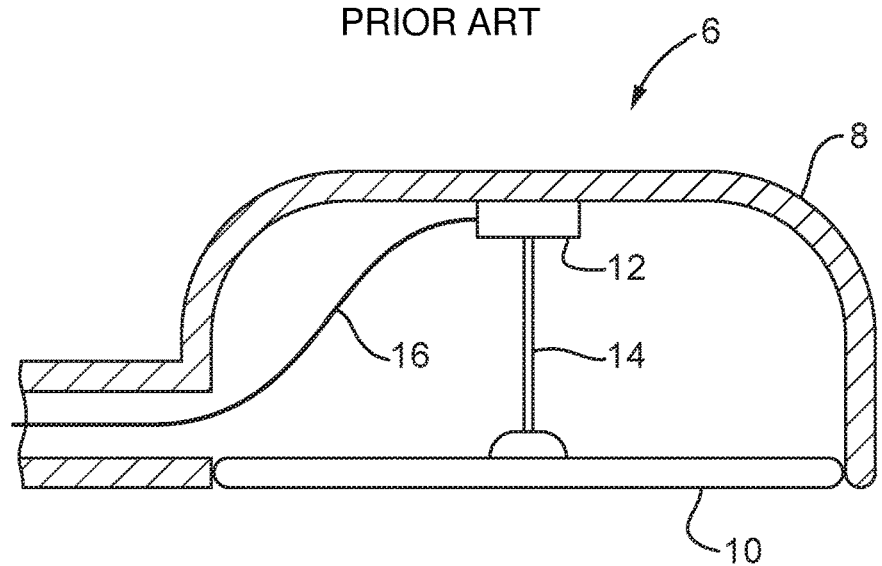
FIG. 2 is a schematic sectional view of a wing mirror according to known prior art.

The mirror 4, 6 may be adjusted (step 400), e.g. rotated about a horizontal and/or vertical axis. The mirror may be adjusted using the adjustor 12 and connecting rod 14, as described with reference to FIG. 2 above, although it will be appreciated that the mirror may be adjusted using any other arrangement or mechanism. The orientation of the mirror may be adjusted about an axis that passes through the mirror or is spaced apart from the mirror.

The mirror may be adjusted such that the field-of-view provided to the driver by the mirror is substantially unaffected by a change in the 3D position of the driver's eye. If the driver changes posture during driving, for example to sit more upright in the seat, the mirror may be adjusted such that the same mirror field-of-view is available to the driver after the change in posture.

The method 400 may further comprise determining a desired reflected line-of-sight and/or reflected field-of-view (406) of the driver. The orientation of the mirror may be adjusted such that the reflected line-of-sight and/or field-of-view provided by the mirror moves towards or is substantially equal to the desired reflected line-of-sight and/or field-of-view. The mirror may be adjusted dynamically, e.g. continuously, to provide the desired field-of-view and/or reflected line-of-sight.

The desired reflected line-of-sight and/or field-of-view of the driver may be determined by identifying the position at which the driver is looking relative to the center (or other reference or datum location) of the mirror. If it is determined that the driver is looking away from the center of the mirror, the mirror may be adjusted to provide a greater field-of-view in the direction the driver is looking. If the driver is looking at a substantially central portion of the mirror, the mirror may be returned to an unadjusted position.

Figure 5:
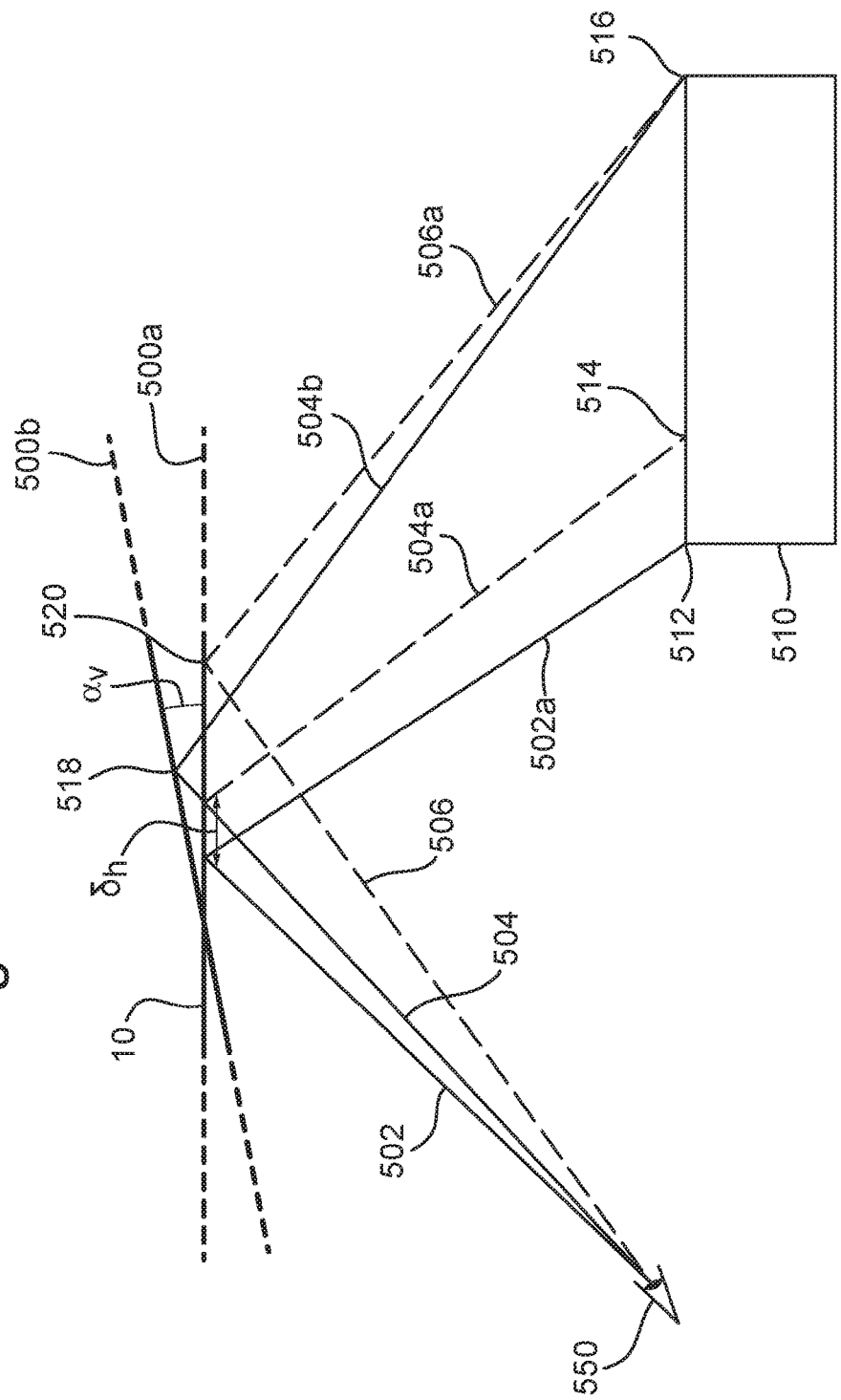
FIG. 5 is a schematic view showing reflected lines of sight of a driver in an unadjusted and adjusted mirror.

With reference to FIG. 5, a mirror, such as the mirrored surface 10 of the mirrors 4, 6, may initially be positioned in an unadjusted, datum position 500a. The driver may look into the mirror from a position 550, and may view an object 510 in a reflection from the mirror. In order to view a near end 512 of the object 510, the driver may look along a line-of-sight 502 and a reflected line-of-sight 502a. As shown in FIG. 5, the line-of-sight 502 may intersect the mirror at a substantially central point on the mirror.

If the driver changes the position of his eye(s) to look along line-of-sight 504 (thereby shifting his gaze direction to look at mid-location 514 of object 510), this eye movement may be detected by the camera 120. As depicted in FIG. 5, when looking along the line-of-sight 504, the point of intersection of the driver's line-of-sight with the mirror surface 10 is now offset from the central point, having moved a distance $\delta_h$ from the center of the mirror.

The orientation of the mirror 4, 6 may be adjusted by the controller 700 into an adjusted position 500b, in response to the change of the driver's line-of-sight. As shown in FIG. 5, the mirror may be adjusted by rotating the mirror through an angle $\alpha_v$ about a vertical axis of the mirror. In the adjusted position, the driver may look at a point 518 on the mirror, so that the previous offset between the line-of-sight and the central position of the mirror is reduced. Reflected line-of-sight 504b may be provided to the driver and a far end 516 of the object 510 may be visible.

If the mirror had not been adjusted and had instead remained in the unadjusted position 500a, the driver would instead be presented with a reflected line-of-sight 504a in which a mid-location 514 of the object 510 may be visible. If the mirror was not adjusted, in order to view the far end 516 of the object 510, the driver may look at an edge location 520 on the mirror, along line-of-sight 506 to gain reflected line-of-sight 506a.

The edge location 520 may be positioned at the edge of the mirrored surface of the mirror 10 and the far end 516 of the object 510 may therefore be visible at an edge of the field-of-view provided by the mirror. In contrast, the position 518 may be in a more central location of the mirror and hence the field-of-view provided to the driver by the mirror, when the mirror 4, 6 is adjusted in response to the movement of the driver's eye, may be greater in the direction the driver is looking.

As described above, if the driver moves his eye back to look again along line-of-sight 502 (thereby reducing the offset between the line-of-sight and the central point of the mirror), the mirror may return to the unadjusted position 500a and the near position 512 of the object 510 may be visible.

Figure 6A:
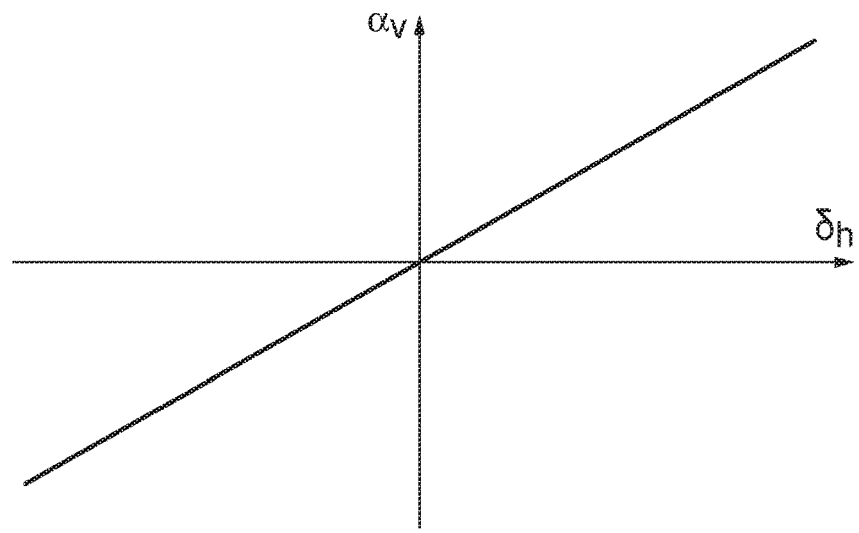
FIGS. 6a and 6b show one possible relationship between an angular adjustment of a mirror and a change in the line-of-sight of a driver in the horizontal and vertical directions respectively, according to arrangements of the present disclosure.

With reference to FIG. 6a, the angular deviation of the mirror about the vertical axis of the mirror ($\alpha_v$), with respect to a datum position of the mirror, may be a function of the horizontal distance from a central point on the mirror to the point of intersection of the line-of-sight of the driver with the mirror ($\delta_h$). For example, as shown in FIG. 6a, $\alpha_v$ may vary linearly with $\delta_h$, although other non-linear relationships are also contemplated. The function and/or the datum positions (from which $\alpha_v$ and/or $\delta_h$ is measured) may change depending on the driving mode of the vehicle.

Figure 6B:
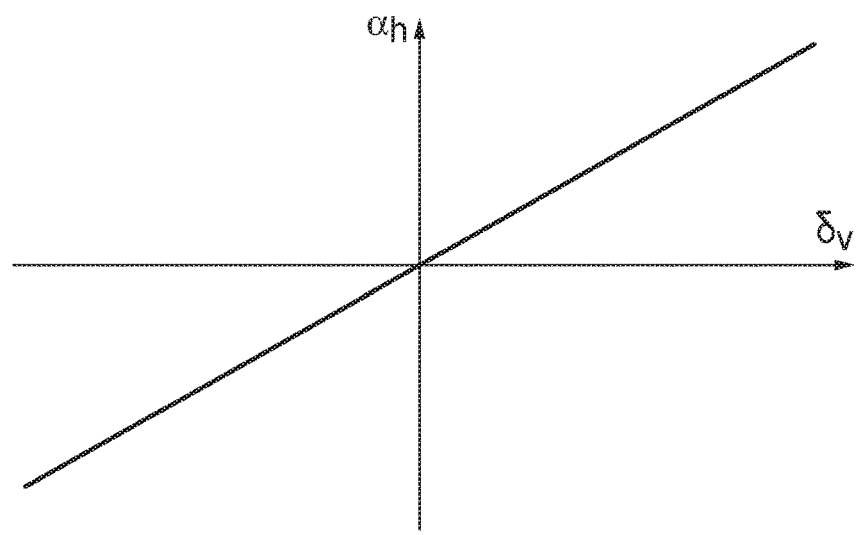

With reference to FIG. 6b, the angular deviation of the mirror about a horizontal axis of the mirror ($\alpha_h$), with respect to a datum position of the mirror, may be a function of the vertical distance from the central point on the mirror to the point of intersection of the line-of-sight of the driver with the mirror ($\delta_v$). For example, as shown in FIG. 6b, $\alpha_h$ may vary linearly with $\delta_v$, although other non-linear relationships are also contemplated. Similar to $\alpha_v$ and $\delta_h$, The relationship between $\alpha_h$ and $\delta_v$, and/or the datum positions (from which $\alpha_h$ and/or $\delta_v$ is measured), may change depending on the driving mode of the vehicle. The function linking $\alpha_v$ and $\delta_h$ may be different to the function linking $\alpha_h$ and $\delta_v$, e.g. the gradient of a linear relationship may be different.

Different adjustments of the mirrors may be desirable during different driving modes. For example, adjusting the mirrors to see the ground adjacent to a rear wheel of the vehicle may be desirable during a reversing maneuver, but may not be desirable during a turning maneuver. In some cases it may be desirable to allow the field-of-view to be adjusted before or in anticipation of performing a maneuver, for example before completing a turning maneuver or merging into traffic. Such maneuvers may be detected or predicted before they are performed, for example when the driver uses a turn indicator provided on the vehicle.

The method 400 may comprise detecting a driving mode of the vehicle. The driving modes detected may include but are not limited to, parked, stationary, cruising, turning, reversing and merging. The range of possible adjustments to the position and/or orientation of the mirror may be determined according to the type of driving mode.

When performing certain maneuvers, a field-of-view different from that provided during normal driving may be preferable for the driver. For example, when reversing it may be preferable for the field-of-view provided by a wing mirror to be lower than for normal driving. The position and/or orientation of the mirror may therefore be adjusted when a reverse maneuver is detected, to provide the preferred field-of-view. The preferred field-of-view for each maneuver may be set and/or adjusted by the driver. The driver's preferred field-of-view for one or more driving modes may be stored by the controller 700. The controller 700 may recognize the eyes of the driver, e.g. the iris color and/or pattern of the driver's eyes, and may recall the preferred fields-of-view stored by that driver.

Providing alternative fields-of-view during certain maneuvers may be beneficial when the vehicle is not provided with a central rear view mirror 4, or when a bulkhead is fitted to a vehicle which prevents the driver from gaining a central rear view from a central mirror, for example in a van.

Certain obstacles (objects or other vehicles) around the vehicle 102 may be of particular interest to the driver during certain driving modes. For example when turning, a motor bike located to the side of the vehicle may be of particular interest to the driver, or when merging, a car approaching the vehicle from the rear and preparing to overtake may be of particular interest to the driver. The object detected may not be in the field-of-view provided to the driver by the mirror when the object is detected. The method 400 may further comprise detecting an object of interest to the driver and adjusting the field-of-view provided by the mirror 4, 6 such that the object is visible to the driver.

Whilst operating in a cruise drive mode, the driver may alter the position of their head or eye inadvertently and may still require the same field-of-view to be provided by the mirror 4, 6. In such a driving mode, or if it is determined that the driver is not looking at the mirror, the orientation of the mirror 4, 6 may be adjusted such that the field-of-view provided by the mirror is substantially unaffected by a change to the 3D position of the driver's eye. This may allow the mirror 4, 6 to adjust automatically to a change in seating position or posture of the driver and continue providing the same reflected view to the driver.

However, during certain drive modes, such as when performing certain maneuvers, a change in the 3D position of the head or eye of the driver may indicate a desired change in the field-of-view provided to the driver by the mirror. In such driving modes, or if it is determined that the driver is currently looking at the mirror, the 3D position of the eye of the driver may be considered when determining a desired reflected line-of-sight and/or a field-of-view and the orientation of the mirror may be adjusted accordingly.

During certain driving modes, it may be determined that adjusting the mirror according to the movement of the driver's eye and/or a change in the 3D position of the driver's eye is not desirable, for example it may be considered distracting for the driver. Therefore, when certain predetermined driving modes are detected, adjustments may not be performed to the orientation of the mirror. However, the mirror 4, 6 may still be adjusted to provide a preferred field-of-view for the driving mode.

In some cases, the driver may not require the system to be operating. A control system (not shown) may be provided to allow the driver to selectively deactivate the method 400, such that the mirrors are not adjusted.

With reference to FIG. 7, the controller 700 may be configured to adjust the mirror of the vehicle. The controller 700 may comprise a first module 702, configured to track the movement of the eye of the driver using a camera. The controller 700 may comprise a second module 704, configured to determine the driver's line-of-sight. The controller 700 may further comprise a third module 706, configured to adjust the orientation of the mirror of the vehicle in response to the movement of the driver's eye, to adjust the field-of-view provided to the driver.

The total field of vision provided by a mirror may be defined as the combination of the fields-of-view provided by the mirror over the range of possible adjustments of the mirror. By dynamically adjusting the reflected line-of-sight and/or field-of-view provided by the mirror, as described above, the total field of vision available to the driver may be equivalent to that provided by a larger mirror, or a mirror comprising non-planar portions providing variable magnification of the reflected image. The vehicle 102, according to the present disclosure, may therefore be provided with a smaller mirror than the previously proposed vehicle 2 and may still provide the same total field of vision. Additionally, the blind spot mirror 18 may not be required to allow the driver to see objects in the blind spot of the wing mirror 6.

Providing a smaller mirror may reduce the wind resistance of the mirror and may improve the fuel efficiency of the vehicle 102. Additionally, the mirror 4 may comprise a substantially planar mirrored surface and hence may provide a substantially undistorted image without the total field of vision available from the mirror being reduced.

It will be appreciated by those skilled in the art that although the invention has been described by way of example, with reference to one or more examples, it is not limited to the disclosed examples and alternative examples may be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   detecting a position and a gaze direction of a driver's eye by a vehicle-mounted camera;
   determining by a controller a) the eye's line-of-sight, b) a point at which the line-of-sight intersects a vehicle mirror surface, and c) an offset direction between b) and a reference position on the mirror; and
   automatically adjusting, by a motor, the mirror's angular orientation to shift a field-of-view provided by the mirror toward the direction of offset.

2. The method of claim 1, further comprising:
   in response to the controller determining that a magnitude of offset between the point and the reference position has reduced, operating the motor to readjust the angular orientation of the mirror to shift the field-of-view away from the direction of offset.

3. The method of claim 1, further comprising operating the controller to detect a driving mode of the vehicle and adjusting the angular orientation of the mirror based upon the driving mode.

4. The method of claim 3, wherein adjustments to the angular orientation of the mirror of the vehicle in response to a change in the position of the eye are suppressed when the driving mode is a predetermined driving mode.

5. The method of claim 1, wherein the angular orientation of the mirror is adjusted dynamically.

6. The method of claim 1, further comprising:
   operating the camera to detect an object of interest to the driver; and
   adjusting the angular orientation of the mirror such that the object remains within the field-of-view.

* * * * *